March 22, 1938.    F. MEYER    2,111,985
CONTAINER
Filed Oct. 23, 1933
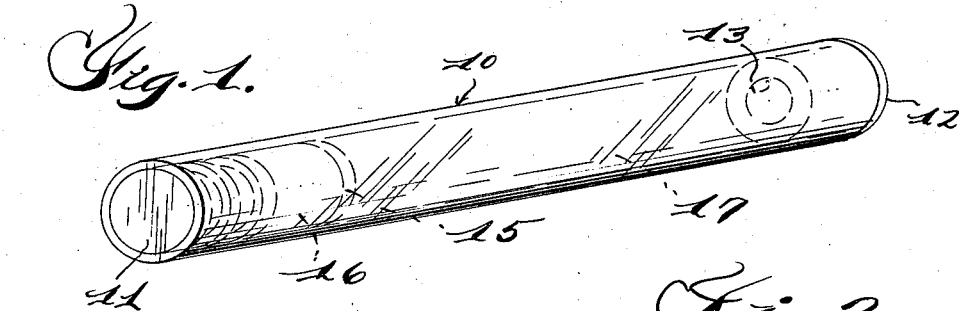
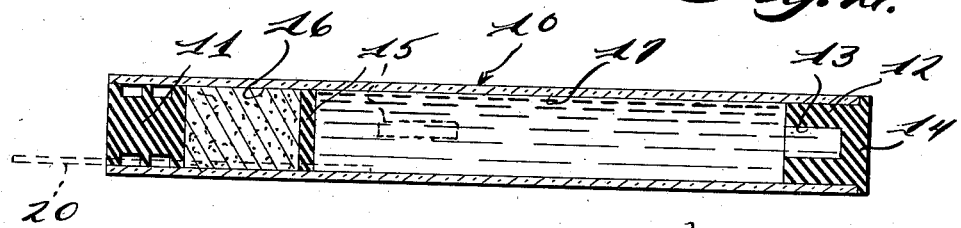
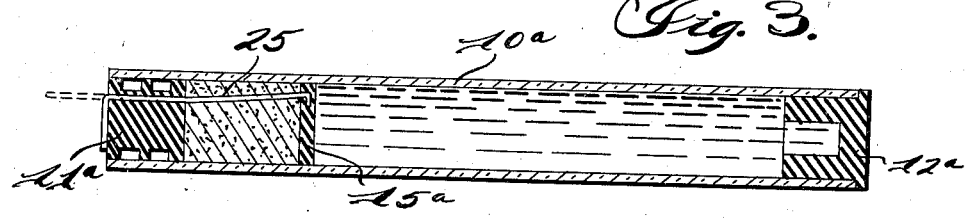
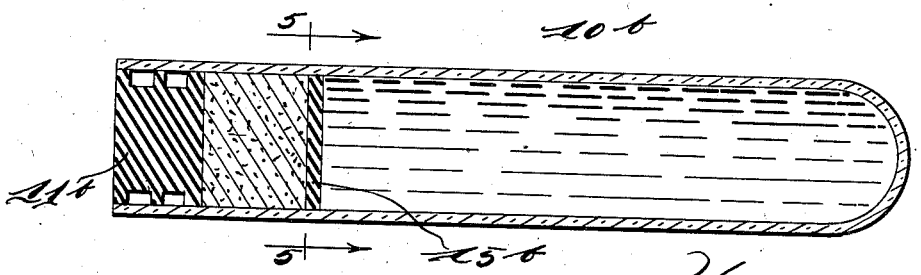
INVENTOR
Felix Meyer
BY
ATTORNEY Patented Mar. 22, 1938

2,111,985

UNITED STATES PATENT OFFICE 2,111,985

CONTAINER

Felix Meyer, Aachen, Germany, assignor to Kimble Glass Company, Vineland, N. J., a corporation of Illinois Application October 23, 1933, Serial No. 694,726
In Germany March 28, 1933

1 Claim. (Cl. 128—218)

This invention relates generally to containers and has particular reference to a container in the nature of an ampoule or the like.

One of the primary objects of this invention is to provide a container of the above mentioned character having means dividing the interior thereof into several sealed chambers which means will function to maintain the contents of the several chambers separated from each other.

A further object of the invention is to provide a container of the above mentioned character in which the means which divides the interior of the container into the several chambers may be moved to place the chambers in communication with each other to thus provide for a mixing of the contents of the several chambers.

The invention further contemplates the provision of a container in which the dividing means may be located at any desired point so that the several chambers formed within the container may be of any size desired.

It is a further object of this invention to provide a divided container which may be economically manufactured and to provide a divided container the contents of which may be wholly removed when desired.

Numerous other objects and advantages of this invention will become more apparent as the following description proceeds particularly when reference is had to the accompanying drawing wherein Figure 1 is a perspective view of a container constructed in accordance with the teachings of this invention;

Figure 2 is a longitudinal sectional view through the container shown in Figure 1;

Figure 3 is a view similar to Figure 2 showing a slightly modified form of construction;

Figure 4 is a view similar to Figure 2 showing a further modified form of construction; and Figure 5 is a section on the line 5—5 of Figure 4.

It is frequently desirable to dispense only freshly prepared solutions of certain therapeutic agents and for this purpose ampoules have been provided having a constricted portion and having a partition or the like located in the constriction to divide the interior of the ampoule into two chambers disposed on opposite sides of the constriction. The substance to be dissolved is stored in one of the chambers while the liquid in which the substance is to be dissolved is stored in the other chamber, the arrangement being such that at the time of using, the means closing the constriction may be removed thus providing for a mixing of the contents of the two chambers to form the desired solution.

Ampoules having constricted portions however, have not been entirely satisfactory for several reasons. First, these ampoules have been relatively expensive since the forming of the constriction therein requires an additional step in the process of manufacture. Secondly, it has been substantially impossible to obtain all of the contents from a container having such a constriction for the reason that the means closing the constriction generally remains near the constriction making difficult and frequently preventing the entire removal of the contents. Further it will be apparent that with a constriction formed in the ampoule it is only possible to locate the partition at the constricted point with the result that no latitude is permitted as to the size of the several chambers formed.

The present invention contemplates the elimination of the above mentioned difficulties and disadvantages by providing a container which is of constant cross sectional area throughout its length and in which the partition may be located at any desired point. The partition is of such a nature that it efficiently seals the several chambers so as to prevent the mixing of the contents of the chambers with each other. The partition is, however, adapted to be moved to a position where the two chambers are placed in communication with each other and when so moved provides for the complete removal of the contents of the container.

In the drawing wherein several embodiments of the inventive idea are disclosed and wherein like reference characters designate corresponding parts throughout all views, the numeral 10 designates a container which is preferably formed of glass or some similar material and which may, as illustrated, be circular in cross section. The ends of the container are shown as being closed by plugs 11 and 12, these plugs being preferably of some resilient material such, for example, as rubber so as to wholly seal the container. The plug 12 may, if desired, be provided with a recess 13 to provide a thin closure portion 14 which may be punctured by a hypodermic needle or the like to provide for the withdrawing of the contents of the receptacle.

Disposed within the container is a partition 15. This partition is relatively thin and is preferably formed of some elastic material such, for example, as rubber. Its periphery snugly engages the inner wall of the container to divide the interior of the container into two chambers designated by the reference characters 16 and 17. The chamber 16 is shown as containing a powder which is adapted to be dissolved in the liquid contained in chamber 17. The partition 15 however, normally seals the two chambers so that the liquid and powder are prevented from mixing with each other.

By virtue of the fact that the partition is relatively thin it may be readily tilted by the exertion thereon of a force preferably eccentrically thereof. This force may, as illustrated in Figure 2 of the drawing, be exerted on the partition adjacent one edge thereof, by a needle or rod 20 which may be forced either through the closure 11 or between this closure and the adjacent wall of the container in the manner illustrated.

Upon tilting of the partition a portion of the periphery thereof will be moved out of engagement with the inner wall of the container thus placing the two chambers 16 and 17 in communication with each other and providing for a mixing of the contents of these chambers. After the partition has been tilted it will not again return to its original position but will remain in a position either inclined with reference to or parallel with the axis of the container and will move gently to the remote end of the container. Thus with the partition tilted it will be apparent that the contents of the container may be wholly removed.

In Figure 3 a slightly modified form of construction is disclosed in which the container 10$^a$ is shown as being closed by the stoppers 11$^a$ and 12$^a$ and as being divided interiorly by the thin partition 15$^a$. In this modified form of construction, however, there is secured to the partition adjacent one edge thereof a thread or wire 25. This wire may be secured to the stopper 11$^a$ so that a movement of the stopper longitudinally of the container will effect a tilting of the partition or the wire may, as illustrated, pass entirely through the stopper and be provided with an exposed end which may be pulled to effect the desired tilting of the partition.

In Figures 4 and 5 a further modified form of construction is disclosed in which the container 10$^b$ is disclosed as being of oval cross sectional shape rather than of circular cross sectional shape as the previously described forms. Further, in the embodiment shown in these figures the stopper 12$^a$ is eliminated and this end of the container is sealed by the material of the container itself as in the previously described embodiments the container is provided with a partition 15$^b$ and a stopper 11$^b$ the arrangement being such that the partition may be tilted to provide communication between the two chambers within the container. The oval shape of the container makes it possible to tilt the partition with slightly more ease.

From the above it will be apparent that the invention provides a container in the nature of an ampoule which container is divided into two sealed chambers. The container is free from constricted portions and the partition may therefore be located at any desired point to obtain any desired relation between the sizes of the several chambers formed.

The partition is of such a character that while normally it seals the two chambers and prevents the mixing of the contents of the chambers, it may however, be readily tilted to place the chambers in communication with each other. After the partition has been tilted it will not return to its sealing position and will thus permit the removal of all of the contents of the container.

While several embodiments of the invention have been described with some detail it is to be understood that the description is for the purposes of illustration only and is not definitive of the limits of the inventive idea. The right is reserved to make such changes in the details of construction and arrangement of parts as will fall within the purview of the attached claim.

What I claim as my invention is:

In a device of the character described, a container, a relatively thin partition in said container dividing the interior thereof into two chambers, said partition being adapted to be tilted within the container to place said chambers in communication with each other, a closure for one end of the container adapted for movement longitudinally of the container, and a rigid connecting element secured to said closure and to said partition adjacent the periphery of said partition whereby longitudinal movement of said closure effects a tilting of the partition.

FELIX MEYER.